March 3, 1964 W. H. THOMAS 3,122,891

CRYOGENIC METHODS AND APPARATUS

Filed Dec. 11, 1958 8 Sheets-Sheet 1

INVENTOR.
WILLIAM H. THOMAS
BY Shanley & O'Neil
ATTORNEY

INVENTOR.
WILLIAM H. THOMAS
BY Shanley & O'Neil
ATTORNEY

CRYOGENIC METHODS AND APPARATUS

Filed Dec. 11, 1958

INVENTOR.
WILLIAM H. THOMAS
BY Shanley & O'Neil
ATTORNEY

CRYOGENIC METHODS AND APPARATUS

Filed Dec. 11, 1958 8 Sheets-Sheet 4

INVENTOR.
WILLIAM H. THOMAS
BY Shanley & O'Neil
ATTORNEY

INVENTOR.
WILLIAM H. THOMAS
BY Shanley & O'Neil
ATTORNEY

March 3, 1964 W. H. THOMAS 3,122,891

CRYOGENIC METHODS AND APPARATUS

Filed Dec. 11, 1958 8 Sheets-Sheet 6

INVENTOR.
WILLIAM H. THOMAS

BY Shanley & O'Neil

ATTORNEY

CRYOGENIC METHODS AND APPARATUS

Filed Dec. 11, 1958 8 Sheets-Sheet 7

INVENTOR.
WILLIAM H. THOMAS
BY Shanley & O'Neil
ATTORNEY

March 3, 1964 W. H. THOMAS 3,122,891

CRYOGENIC METHODS AND APPARATUS

Filed Dec. 11, 1958 8 Sheets-Sheet 8

INVENTOR.
WILLIAM H. THOMAS

BY Shanley & O'Neil

ATTORNEY

United States Patent Office 3,122,891
Patented Mar. 3, 1964

3,122,891

CRYOGENIC METHODS AND APPARATUS

William H. Thomas, Allentown, Pa., assignor, by mesne assignments, to Air Products and Chemicals, Inc., Trexlertown, Pa., a corporation of Delaware Filed Dec. 11, 1958, Ser. No. 779,779
5 Claims. (Cl. 62—45)

The present invention relates to cryogenic methods and apparatus, and more particularly to methods and apparatus for conditioning rocket missiles powered by low-boiling propellants for launching.

The term "rocket missiles" as used herein includes manned and unmanned vehicles powered by the thrust of a continuous, confined oxidation reaction and adapted for either guided or ballistic terrestrial flight or for orbital or extra-terrestrial flight.

In rocket missiles as defined above, the oxidation reaction takes place between a fuel proper, which is a readily oxidizable substance such as kerosene or other hydrocarbons, alcohol or hydrogen, and an oxidizing agent, such as oxygen or fluorine. These components, either together or separately, are referred to herein as the "propellant"; and the propellant is hereinafter termed "low-boiling" when one or both of the components thereof is normally gaseous at ambient temperatures and may be maintained in liquid phase only at low temperatures, e.g., —297° F. to —423° F. Of course, the boiling temperatures vary with pressure; and hence, the values given are subject to wide variation.

Thus, for example, in a rocket missile powered by the combustion of a mixture of kerosene and oxygen, the kerosene and oxygen are separately stored in compartments of the missile in liquid phase. The liquid oxygen is the low boiling propellant, and the kerosene and oxygen are mixed together and ignited to launch the missile. The powered flight of the missile continues so long as there remains a supply of kerosene and oxygen portions of which may be continuously mixed to continue the confined oxidation reaction.

As is well known, a large number of variable factors must be controlled with great accuracy if a predetermined missile flight pattern is to be successfully achieved. Ordinarily, the powered portion of a missile's flight is only a relatively very small initial portion of the total flight; and hence, any deviation from desired performance during powered flight will result in a correspondingly much greater deviation during final stages of the flight or in total failure of the shot. Among the many factors to be accurately controlled are the over-all weight of the missile, the quantity of propellant, the quantity of extraneous material which collects on the exterior of the missile, and the temperature and rate of temperature change of the instrumentation.

In the past, when a low-boiling propellant has been used, serious difficulties have arisen in connection with the regulation of these and other factors. As noted above, these propellants are liquid at temperatures far below ambient, and they tend rapidly to vaporize and to cause frost formation on their containers. Obviously, a missile cannot be charged with low boiling propellants and left standing for any appreciable time prior to launching, else the accuracy of the missile would be destroyed not only by loss of propellant through vaporization but also by the progressive increase in the quantity of deposited frost. The lost propellant would not only progressively reduce the overall weight of the missile, but also progressively decrease the duration of powered flight in a manner which could not be accurately compensated; and the deposit of frost on the exterior of the missile would not only progressively increase the overall weight of the missile but would also alter its aerodynamic characteristics.

Accordingly, it has been a common practice in the past not to charge missiles with low-boiling propellants until shortly before launching. In this way, a relatively smaller quantity of propellant boils away and the deposit of frost is also reduced.

But although such delayed charging of missiles helps to overcome certain disadvantages, it introduces several other very grave difficulties. First and most seriously is the fact that missiles which must be charged immediately prior to use are not available for instant use. Inevitably, a delay for charging intervenes between the decision to launch the missile and the actual launching thereof. In the case of missiles for military use, such inevitable delay renders the missiles extremely vulnerable to hostile countermeasures.

Also, the charging of missiles immediately prior to use makes temperature control almost impossible. The instrumentation carried by missiles is quite sensitive and is designed for operation over relatively narrow temperature ranges. Instrumentation may be designed to operate at temperatures adjacent virtually any encountered temperature, but at temperatures substantially removed therefrom the instrumentation will not function accurately and may fail altogether. Obviously, when a large mass of very cold liquid is introduced into a missile which is at ambient temperature, a large and rapidly changing temperature gradient is immediately established over the missile. Heat flows rapidly into the low boiling propellant, and the temperatures of all adjacent portions of the missile progressively and variably decrease. If the interval between the commencement of charging and the launching of the missile can be accurately determined, the temperatures of all portions of the missile at launching can be predicted and the instrumentation designed accordingly; but if charging does not proceed quite according to plan or if the "count-down" preceding launching is otherwise much protracted, then the shot must be canceled as the instrumentation has cooled below its designed temperature range.

The rapid transfer of heat to the propellant also causes the propellant to boil vigorously and makes it virtually impossible accurately to determine the quantity of propellant in the missile at any given time. The quantity of propellant introduced into the missile is no accuate indication of the quantity remaining, as an appreciable portion of the introduced propellant boils away. Moreover, the turbulence of the boiling propellant renders quantity measurement by liquid level determination quite imprecise. Further, the evaporation of propellant at high rates tends to increase the concentration of any propellant contaminants, be they substances of lower boiling point or solidified substances of higher boiling point. Such substances, while tolerable in small concentrations in propellants, when concentrated many-fold, introduce hazards and the prospect of failure not previously present.

These problems of heat transfer can be somewhat lessened by the use of insulation so positioned as to retard heat flow into the charge of low boiling propellant. But as the quantity of propellant is large, so also the quantity of insulation must be large; and the weight of the insulation requires that the weight of the payload must be decreased an equal amount. When it is considered that the weight of the payload is ordinarily only a tiny fraction of the overall weight of the missile, it is obvious that insulation is not the answer to the problem.

It has also been proposed to provide long-term continuous charging techniques, by which low-boiling propellant would be continuously introduced into the missile at a rate which would hopefully be just sufficient to replace the propellant that would continuously boil off. In this way, a full but continuously changing charge of low-boiling propellant would be maintained in the missile over long periods of time. The missile would reach substantial thermal equilibrium; that is, the various components of the missile would cool as low as they would ever be cooled having regard for their proximity to the cold propellant, and thereafter would not change much in temperature. The instrumentation would be successfully designed for such lowest equilibrium temperatures.

As in the case of delayed charging, however, long-term continuous charging would remove certain difficulties only to introduce others. In the first place, just as the components of a continuously charged missile would be at thermal equilibrium, so also the cold propellant would be at thermal equilibrium, which in this case would mean that it would be boiling; and as was noted above, it is difficult if not impossible accurately to determine or regulate the quantity of a boiling liquid in a missile. As a result, the quantity of propellant would be only approximately the predetermined quantity at any given time. In the second place, continuous charging would give rise to serious problems of frost deposit. In the third place, a large quantity of propellant would be continuously consumed in an effort to keep up with losses from the large tanks of boiling propellant. And in the fourth place, and perhaps worst of all, continuous charging would not eliminate the problems of delay in launching missiles. A continuously charged missile would necessarily be in liquid communication with a source or stored quantity of low-boiling propellant, and would be connected with various test equipment and controls to regulate continuous charging. Freeing the missile from this associated equipment and preparing it for launching as a closed system rather than a system having external communication would still be a job which would consume more time than can be afforded in the case of a reliable weapons system.

Furthermore, as has been indicated above, there is considerable boil-off of propellant in connection with either delayed charging or long-term continuous charging; and the released vapors may be quite harmful depending upon the nature of the propellant. For example, it is obvious that the vapors from highly flammable fuels such as hydrogen, or from highly toxic and corrosive oxidizers such as fluorine, present considerable hazard to the missile, the installation, and the adjacent personnel.

In view of all this, many have concluded that low-boiling propellants are inherently ill-suited for missile applications; and in recent years, much attention has been given to solid propellants. Solid propellants have the advantage that they can be maintained at ambient temperatures practically indefinitely without loss of effectiveness. Thus, missiles powered by solid propellants are available for instant use.

Unfortunately, however, solid propellants also have several serious disadvantages. In the first place, compared to liquid propellants, solid propellants are low energy fuels. Liquid propellants deliver considerably more thrust per pound of propellant than do solid propellants. To achieve a desired thrust for a given period of time, a considerably greater mass of solid propellant must be carried by the missile than if liquid propellants were used; and this weight differential is at the expense of payload.

In the second place, solid propellants do not burn evenly. Combustion proceeds through the mass of propellant, as distinguished from liquid propellants which can be supplied to a combustion chamber at an accurately controlled rate by the use of pumps and metering devices. No matter how much care is taken in the compounding and formation of solid propellant charges, there remain discontinuities and non-homogeneous regions throughout the body of the charge, and these cause the rate and pattern of combustion to be non-uniform throughout the charge and also cause the total time of combustion to vary.

As a result, missiles powered by solid propellants tend to deviate markedly from their intended flight patterns.

In short, liquid propellants having low-boiling components deliver high energy but are not available for instant use; while the solid propellants which are available for instant use deliver low energy and are erratic. Therefore, this art is confronted with a grave dilemma in that use of the good propellants involves launching delays, while the propellants useful for instant launching are only poor propellants. At least from a military standpoint, the problem has been whether to use good propellants and incur the hazards of delayed launching, or whether to settle for a poor propellant to achieve instant launching.

Needless to say, the most serious considerations of national defense have required that a solution to this problem be found. It is literally true that the most vigorous, around-the-clock efforts have been made to resolve this apparently unresolvable dilemma. Until the advent of the present invention, however, neither the methods described above nor any of the other proposals advanced for this purpose have been successful in solving the problems involved, particularly in military applications.

By the present invention there is provided, for what is believed to be the very first time, what appears to be a completely satisfactory solution to the above problems. By this invention, there are provided methods and apparatus for maintaining rocket missiles powered by low-boiling propellants continuously in condition for instant launching; and this is the heart and the principal object of the present invention.

Another object and feature of this invention is the provision of methods and apparatus for assuring that a fully charged, closed missile system will be at thermal equilibrium at launching.

A further feature and object of this invention is the provision of methods and apparatus for preventing deposits of frost on missiles that are fully charged with low-boiling propellant over long periods of time.

It is another feature and object of this invention to provide such methods and apparatus which make it possible to reduce the working pressure in the propellant chambers of missiles.

Still another object and feature of this invention is the provision of methods and apparatus which make it possible to control with great accuracy the quantity of low-boiling propellant in a missile and to maintain that accurately controlled quantity without variation and with a minimum of supervision and effort.

A still further feature and object of the present invention is the provision of such methods and apparatus which greatly reduce the hazards involved in the use of highly flammable or highly toxic and corrosive low-boiling propellants.

It is also a feature and object of this invention to provide such methods and apparatus which are useful equally well in connection with stationary, mobile or underground missile installations.

Yet another object and features of the present invention is the provision of such methods and apparatus which will greatly reduce the expenses incurred in providing rocket missiles with low-boiling propellants.

Finally, it is an object and feature of this invention to provide such methods and apparatus which will require little or no modification of existing rocket missile designs.

Many other features and advantages of the present invention will become apparent from a consideration of the following description, taken in connection with the accompanying drawings. This invention is of a fundamental and pioneering nature; and hence, it must be remembered that the drawings are only illustrative of a few of the embodiments thereof and are in no sense a limitation on the broad scope of the invention.

In the drawings, in which similar reference numerals denote similar parts throughout:

Figures 4, 5, 7A:
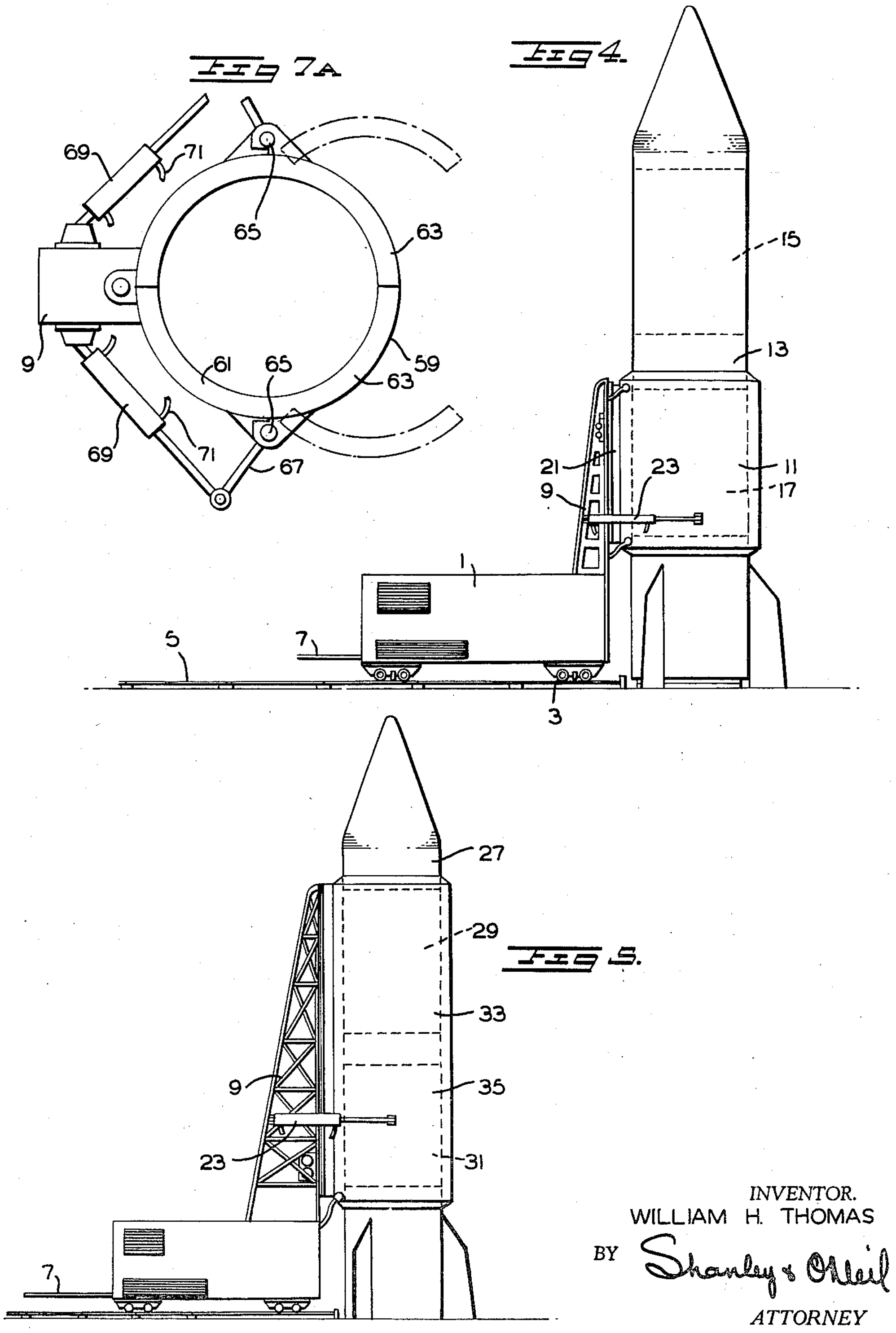
FIGURE 4 is an enlarged elevational view showing the subject matter of FIGURE 2.
FIGURE 5 is a view similar to FIGURE 4 but showing a modified form of a device according to the present invention.
Figures 6, 7:
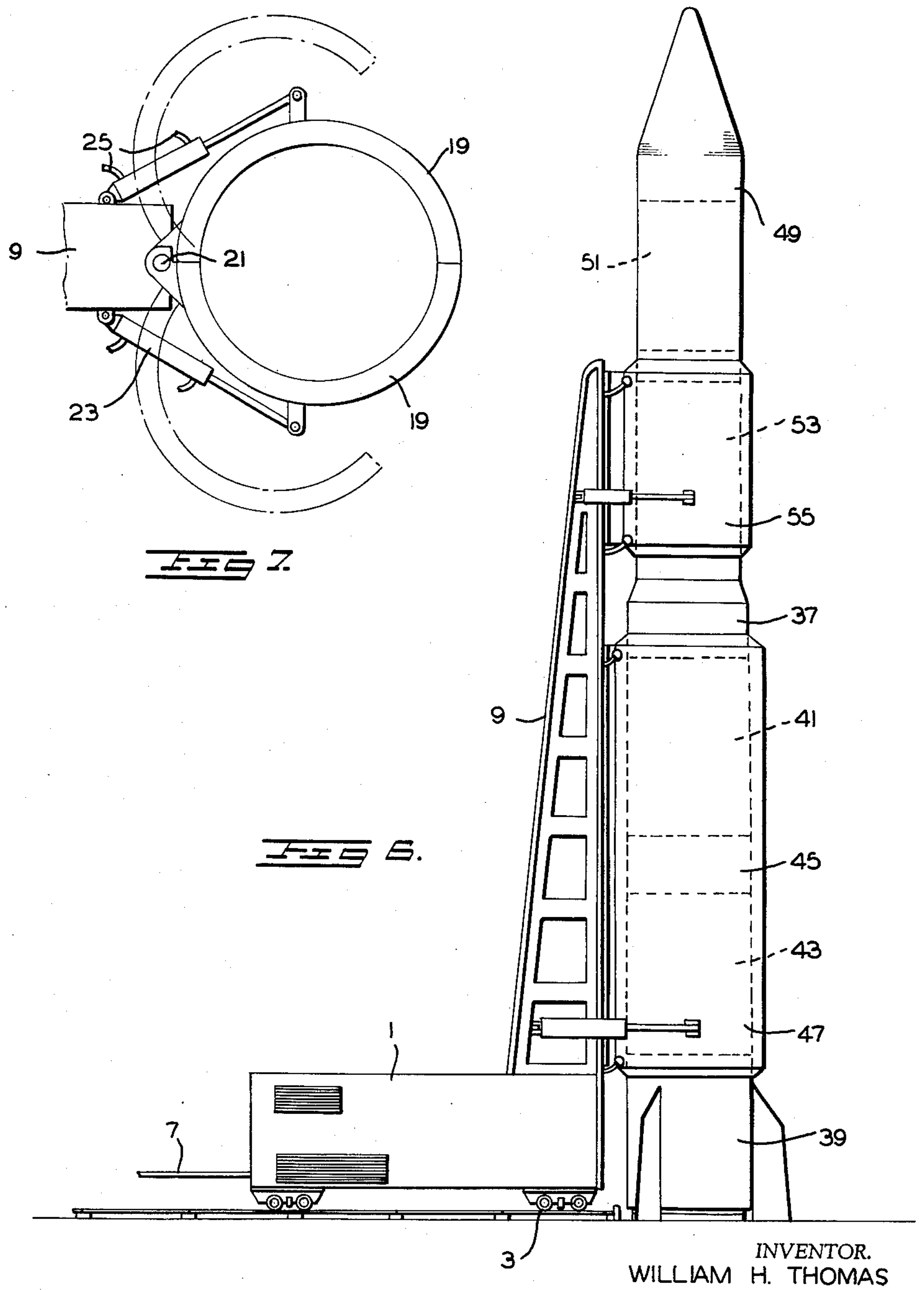
FIGURE 6 is a view similar to FIGURES 4 and 5 but showing a still further modification of the present invention.
FIGURE 7 is an enlarged fragmentary plan view of the portion of a device according to the present invention which engages with a rocket missile.
Figure 8:
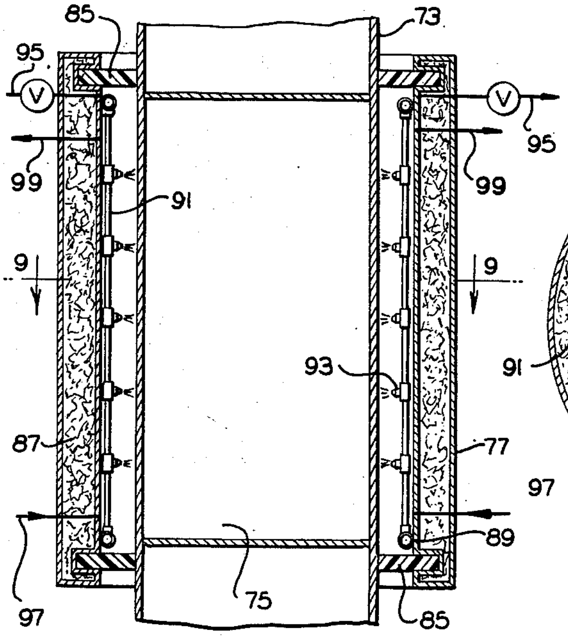
Figure 9:
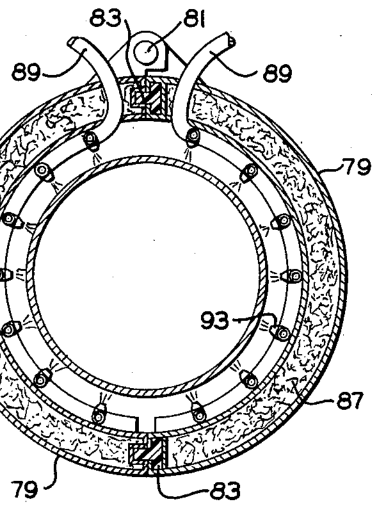
Figures 10, 11:
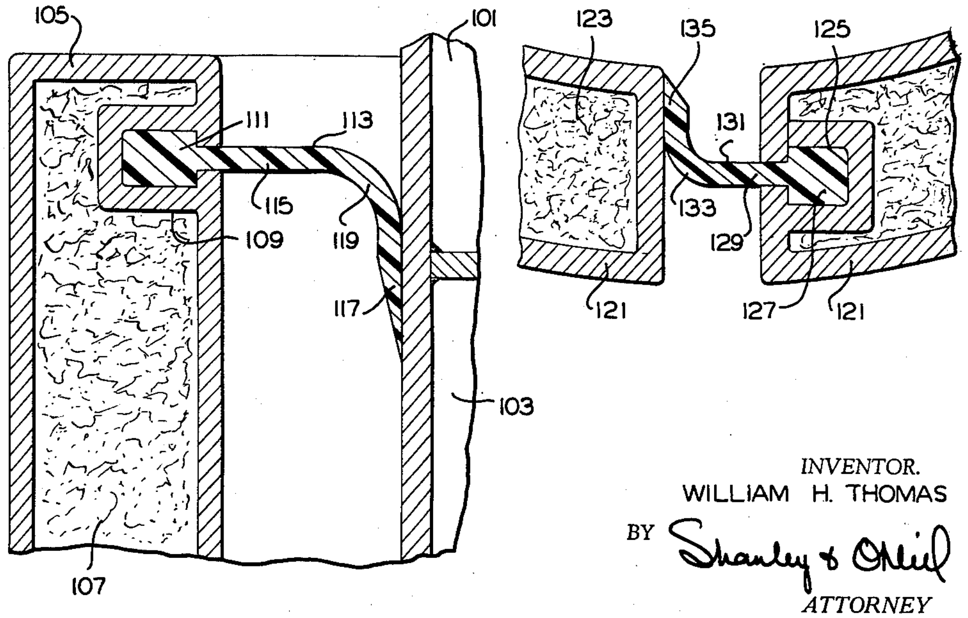
Figure 12:
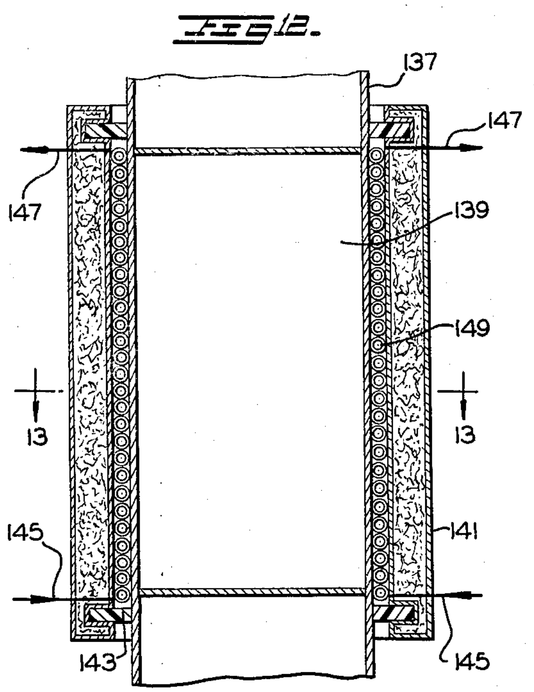
Figure 13:
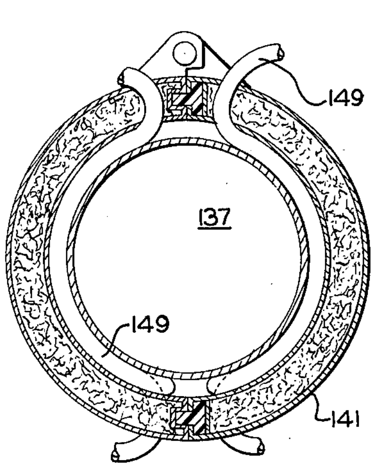
Figure 14:
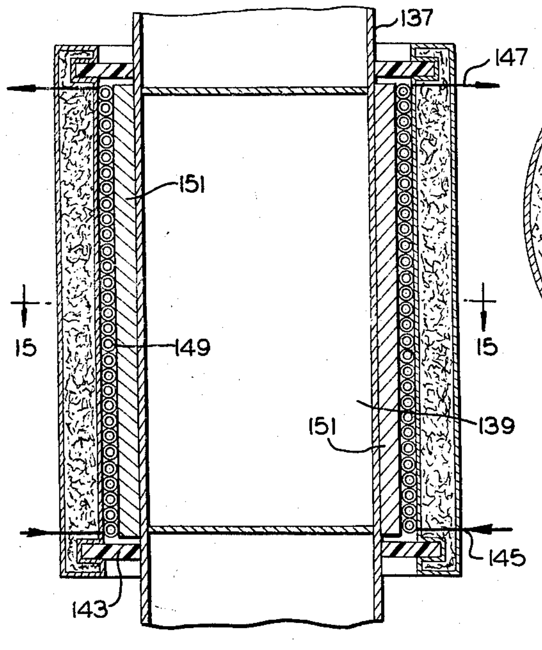
Figure 15:
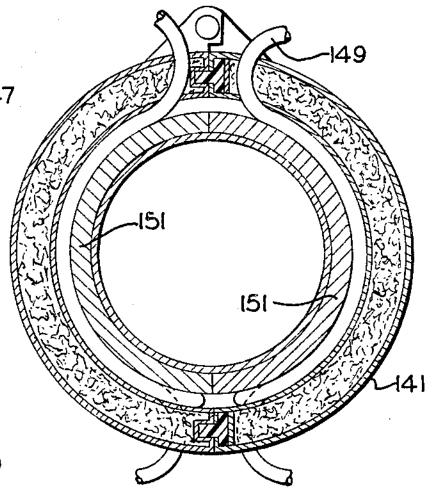
Figure 16:
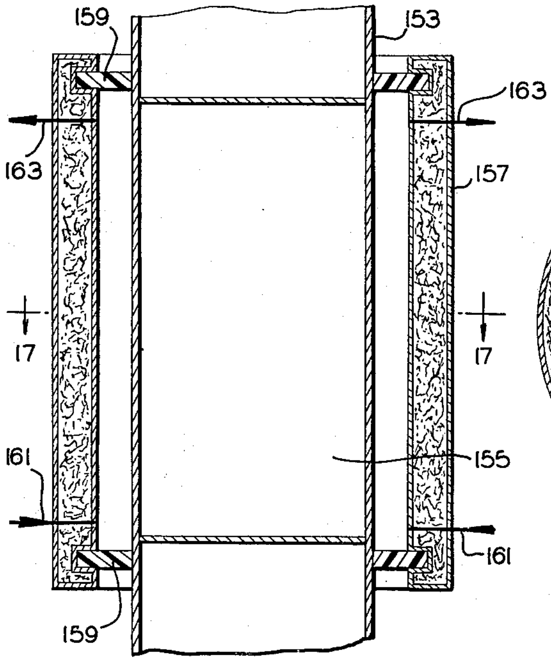
Figure 17:
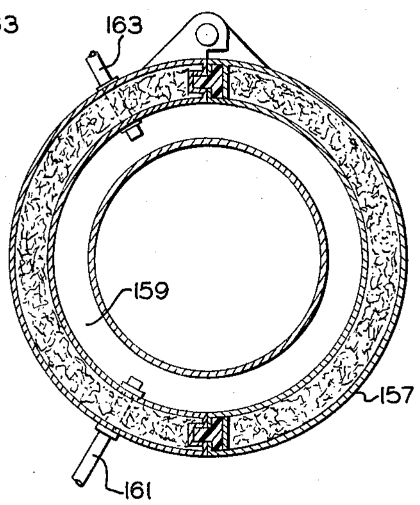
Figure 18:
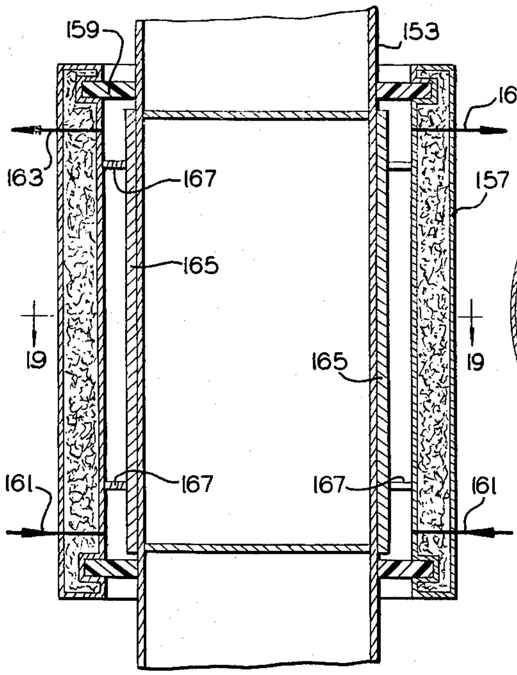
Figure 19:
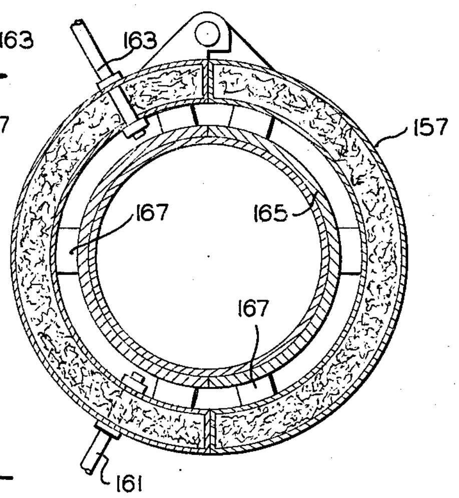

FIGURE 7*a* is a view similar to FIGURE 7 but showing a modified form of the present invention;

FIGURE 8 is a somewhat schematic side cross-sectional view of structure shown in FIGURE 7;

FIGURE 9 is a section taken on the line 9—9 of FIGURE 8;

FIGURE 10 is an enlarged fragmentary cross-sectional view of one embodiment of a sealing arrangement of the present invention;

FIGURE 11 is an enlarged fragmentary cross-sectional view from above of a further sealing arrangement of the present invention;

FIGURE 12 is a view similar to FIGURE 8 but showing a modified form of the invention;

FIGURE 13 is a sectional view taken on the line 13—13 of FIGURE 12;

FIGURE 14 is a view similar to FIGURES 8 and 12 but showing a modified form of the invention;

FIGURE 15 is a sectional view taken on the line 15—15 of FIGURE 14;

FIGURE 16 is a view similar to FIGURE 8 but showing another modification of the invention;

FIGURE 17 is a sectional view taken on the line 17—17 of FIGURE 16;

FIGURE 18 is a view similar to FIGURE 8 but showing a still further modification of the invention;

FIGURE 19 is a sectional view taken on the line 19—19 of FIGURE 18; and

FIGURES 20 through 24 are views similar to FIGURE 8 but showing schematically still other modifications of the present invention.

Referring now to the drawings in greater detail, there is shown a carriage 1 mounted to roll on wheels 3 upon tracks 5. Carriage 1 is adapted to carry refrigeration and control equipment (not shown), including means such as an electric motor by which the wheels 3 are driven so as to propel the carriage over the tracks. The carriage may carry its power source or power may be fed to the carriage such as by an electric power cable 7 associated with the carriage in trailing relationship and connected to a source of electric power (not shown).

At its forward end, as shown in FIGURE 4, carriage 1 supports an upwardly extending skeletal tower 9 on the front of which is carried a refrigerated missile jacket 11 adapted to encompass at least that portion of a single stage rocket missile 13 which is powered by low-boiling propellant. The components of the propellant are stored on-board the missile in a fuel tank 15, which may for example contain kerosene, and an oxidizer tank 17, which may for example contain liquid oxygen. Whichever or both of these tanks contains the low-boiling propellant, and in the illustrated embodiment the oxidizer tank, is surrounded by the jacket. The jacket is adapted to be placed about and removed from the missile; and to this end, as shown in FIGURE 7, the jacket is comprised of a pair of halves 19 mounted for swinging movement relative to each other and to the carriage upon which they are borne, about a vertical axis defined by an elongated vertical hinge 21. The power necessary to swing halves 19 between open and closed positions relative to the missile is supplied by fluid motors 23 acting between halves 19 and a portion of carriage 1 such as tower 9, these motors being reversible and being in fluid circuit with a source of fluid under pressure (not shown) through pressure fluid supply and discharge lines 25.

Another embodiment of the missile jacket according to the present invention is shown in FIGURE 5 in connection with a single stage missile 27 having a fuel tank 29 and an oxidizer tank 31, both the fuel and the oxidizer being cryogenic, for example, liquid hydrogen and liquid oxygen, respectively. Accordingly, jacket 33 is modified so as to be substantially longer than was jacket 11, the two halves 35 of jacket 33 being correspondingly elongated and provided with correspondingly greater refrigeration capacity so as to withdraw heat simultaneously from both the tanks 29 and 31.

In FIGURE 6, the application of the present invention to a plural stage missile is illustrated. As there shown, a two-stage missile 37 is comprised of a first stage 39 including a fuel tank 41 and an oxidizer tank 43. The propellant component used in the first stage are both cryogenic; and hence, a relatively elongated refrigeration jacket 45 is provided to accommodate the first stage, the halves 47 thereof encompassing both the fuel tank and the oxidizer tank of the first stage. In second stage 49 of missile 37, there is provided a fuel tank 51 and an oxidizer tank 53, but only the oxidizer is cryogenic, e.g., liquid fluorine; and hence, only a relatively short refrigeration jacket 55 having halves 57 which encompass only tank 53 is provided.

Thus far, the structure of the jacket has been described as comprising a pair of refrigerated semi-cylindrical halves, with power means for swinging them to open or closed position so that when in closed position the refrigerated jacket will continuously withdraw heat from the low-boiling propellant. However, the structure of the jacket is by no means restricted to a pair of halves as shown in FIGURE 7 but could also take a number of variant forms. For example, in FIGURE 7*a*, a refrigeration jacket 59 carried by tower 9 in the same orientation as the jackets previously described, is comprised of a relatively fixed semi-cylindrical portion 61, at the ends of which are mounted two swingable portions 63 supported for horizontal swinging movement on parallel hinges 65 for oscillation about two parallel vertical axes. At their inner ends, swingable portions 63 carry rearwardly extending arms 67 swingably connected to extensible fluid motors 69 driven through pressure fluid lines from a source of fluid under pressure (not shown) which may, for example, be among the machinery contained in carriage 1.

The refrigerated missile jackets are provided on their interiors with means for positioning a fluid at a temperature lower than the temperature of the cryogenic propellant, in heat exchange relationship with the exterior of at least that portion of the missile which contains the low-boiling propellant so as continuously to withdraw heat from the propellant. In addition to withdrawing heat from the propellant, it will also be appreciated that the fluid converts the jacket into a perfect insulator, as it remains at all times below the temperature of the propellant. In FIGURES 8 and 9, an embodiment of such means in connection with the construction of the refrigerated jacket is shown schematically in somewhat greater detail. As there indicated, a missile 73 has a fuel tank 75 in which may be contained, for example, liquid hydrogen. Tank 75 is of course provided with conventional filling and discharging conduits and equipment and needed instrumentation, none of which is shown so as to keep the disclosure clear ad simple. A refrigerated missile jacket 77 encompasses the exterior of that portion of the missile which contains tank 75 and is comprised of a pair of jacket halves 79, each of which is substantially semi-cylindrical, mounted for swinging movement toward and away from each other about a common hinge 81 which defines a vertically extending axis of swinging movement for halves 79. Preferably, jacket 77 is at least as long as tank 75 and extends a short distance beyond each head of tank 75. To maintain a substantially fluid-tight joint between halves 79 when they are swung together, a pair of vertical seals 83 is disposed along adjacent contacting vertical side edges of halves 79; while annular seals 85, each disposed in a horizontal plane, are provided at the top and bottom of jacket 77 to seal between the jacket and the exterior of the missile. Halves 79 are metal shells filled with insulation 87 such as the usual powder-vacuum insulation commonly used for cryogenic applications, so as to reduce heat flow from the outer surfaces of the jacket to the interior of the jacket.

Means are provided for conducting a fluid in heat exchange relationship with the exterior of the missile, these means being on the interior of the jacket 77 and in the present embodiment comprising header conduits 89. If the liquid in tank 75 is hydrogen, then the fluid in conduits 89 would preferably be liquid helium, supplied in a closed refrigeration circuit by conventional refrigeration equipment (not shown) carried for example within carriage 1. Where the situation warrants, the refrigeration and control equipment may be located at a stationary position convenient to, but removed from the missile launching pad and be connected to the refrigerated missile jacket by means of suitable low temperature fluid transfer lines and other electric or control conduits.

In any event, the important relationship is that the fluid be at a temperature below the boiling temperature of the propellant at the existing pressure. Preferably, the fluid is a liquid having a boiling temperature at its existing pressure lower than the boiling temperature of the propellant at its existing pressure. In this way, both liquids seek equilibrium temperatures between the two boiling temperatures, with the result that the propellant is subcooled while the heat exchange liquid boils. Indeed, it will in certain instances be desirable to subcool the propellant to solid phase, thereby to provide structural support benefits and to lengthen the period of no loss by evaporation following withdrawal of the refrigerated jacket.

Vertical manifolds 91 interconnect holders 89 and are each provided with a plurality of vertically spaced discharge orifices 93 which open inwardly so that liquid helium may be supplied under positive pressure at a plurality of points spaced about the exterior of that portion of missile 73 which contains fuel tank 75. Functionally, it is immaterial whether the fluid is sprayed from orifices 93 onto the skin of the missile and evaporates, or whether a sufficient quantity of fluid in liquid phase is provided such that the annular chamber between seals 85 substantially fills with the liquid; but in either event, the excess fluid, whether all in vapor phase or in part liquid and part vapor phase, returns to the refrigeration equipment through a return conduit 95 in each jacket half.

When the refrigerated jacket first encloses the missile, a quantity of air containing the usual proportions of carbon dioxide and water vapor will be trapped in the annular chamber defined by the jacket about the missile. In addition, if cryogenic propellant has already been introduced into the missile at the time the jacket is placed about the missile, there will also be some frost on the outside of the missile. If this frost is allowed to remain, or if the water vapor or carbon dioxide in the air trapped within the jacket is allowed to solidify, then frost crystals of water ice or carbon dioxide ice will be formed on the outside of the missile or will become entrained in and possibly block the refrigeration circuit such as the liquid helium circuit of the embodiment of FIGURES 8 and 9.

Accordingly, it is highly desirable to assure that the annular chamber within jacket 77 is free from water and carbon dioxide before the actual refrigeration cycle is begun; and to this end, inlet and outlet conduits 97 and 99 are provided through which a gas under positive pressure and free from constituents having a solidification temperature above the temperature of the refrigerant may be cycled. Such a gas may, for example, be nitrogen. The nitrogen may be relatively warm, for example at ambient temperature, if frost has already deposited on the exterior of the missile, thereby to remove this frost, or may be at lower temperatures if the missile is fueled with the jacket in place. Of course, this gas should not be at so low a temperature as to deposit condensibles from the air it is replacing. In short, condensibles are purged through a circuit including conduits 97 and 99, the pumping, drying and adsorption equipment for this circuit being conventional and being carried, for example, within carriage 1. The circuit including conduits 97 and 99 may also be energized immediately before jacket 77 is removed and missile 73 launched, for during long periods of application of helium to the exterior of the missile frost may build up beyond seals 85 where helium escapes from the jacket, or within the jacket adjacent seals 85 where air may enter into the confines of the jacket and deposit its frost. In such case, a relatively warm gas is caused to flow through conduits 97 and 99 for a brief period of time immediately prior to launching so as to remove such frost as may nevertheless accumulate over long periods of time. The removal of frost at this stage also prevents the jacket from sticking to the missile when removed. Naturally, this heating immediately prior to launching is quite brief and is no longer than is necessary to flash off such frost as there may be.

The particular construction of representative types of seals for use between the jacket and the missile and between the jacket halves is shown in FIGURES 10 and 11, although it will of course be understood that many other forms of seals may be used. As there shown, the missile 101 is provided with a tank for cryogenic fuel 103, and this portion of the missile is encompassed by a refrigeration jacket 105 which, as before, is a hollow metal shell filled with insulation 107. At each end of jacket 105 is a circular recess comprised of a pair of semi-circular recesses 109, one in each half of jacket 105. An enlarged root 111 of a cryogenic seal 113 of nylon, Teflon or the like is disposed in recess 109. The sealing portion of seal 113 comprises a flexible resilient flange 115 which is annular and extends inwardly toward and into contact with the skin of missile 101 and terminates in a beveled edge 117 by which close sealing contact with the missile exterior is achieved. Flange 115 is substantially longer than the distance between the jacket 105 and the missile 101, so that seal 113 bends resiliently in contact with missile 101 to form an elbow 119 that resiliently presses beveled edge 117 against the missile.

Seal 113 is suitable for those jackets in which the purge gas is removed through conduits. In other embodiments, however, the purge gas under positive pressure may be discharged past the seals as blow-by. In these latter instances, the seals function more as shields and are not in fluid sealing engagement with the missile.

In FIGURE 11, a jacket comprised of a pair of halves 121 filled with insulation 123 is provided, the vertical seal adjacent and farthest from the hinge of the jacket being accommodated by a vertically extending straight recess 125 in one edge of one half 121. The enlarged root 127 of a cryogenic seal 129 is secured in recess 125; and a straight flange 131 extends toward the other half 121, bends resiliently about an elbow 133 and terminates in contact with that other half 121 in a beveled edge 135. It should be noted that in the embodiments of FIGURES 10 and 11, beveled edge 135 extends inwardly toward the low temperature side of the seal and that the bevel of edge 135 is directed toward the surface against which the seal has sealing contact. In this way, the higher pressure of the refrigerated side of the seal is used to enhance the sealing properties of the seal.

The embodiment of FIGURES 8 and 9 provides a refrigerant in direct heat exchange relationship with the exterior of the missile. In FIGURES 12 and 13, however, an embodiment is disclosed in which the refrigerant fluid is in indirect heat exchange relationship with the exterior of the missile. As there shown, a missile 137 is provided with a cryogenic fuel tank 139, the corresponding portion of the missile being encompassed by a refrigeration jacket 141, the interior of which is loosely sealed off from the atmosphere by seals 143. An inlet conduit 145 and an outlet conduit 147 provide a positive pressure gas purge prior to the onset of refrigeration and also a quick defrost immediately before launching, as in the case of conduits 97 and 99 of FIGURES 8 and 9. The embodiment of FIGURES 12 and 13 is distinctive, however, in that a circuitous course of tubing 149 of a highly heat-conductive material such as copper is provided within jacket 141 so that fluids passing through tubing 149 will be in indirect heat exchange relationship with the exterior of the missile. In this instance, if, say, liquid helium passes through tubing 149 during the refrigeration cycle, at least a portion of this helium will be vaporized by heat from the exterior surface of missile 137 adjacent tank 139 and will thus withdraw heat from the tank. The helium, at least partially in vapor phase, will return to the refrigeration cycle for recompression and re-expansion so as to become re-liquefied for re-use.

A modification of the indirect heat exchange of the embodiment of FIGURES 12 and 13 is shown in FIGURES 14 and 15. The purpose of the embodiment there shown is to improve the indirect heat exchange between the fluid in tubing 149 and the exterior of the missile, by improving the conductive path between the exterior of the missile and tubing 149. To this end, a blanket of copper wool 151 is disposed between tubing 149 and the exterior of the missile, the copper wool providing in effect a nest for tubing 149, thereby to provide an extensive area of metal-to-metal contact between the tubing and the exterior of the missile. Preferably, the blanket of copper wool is secured to the inner side of the tubing and moves with the jacket, although it can of course be secured to the exterior of the missile to be encompassed by the jacket.

In FIGURES 16 and 17 is shown a modified form of a missile jacket in which the means for supplying the refrigerant fluid to the interior of the jacket is quite simple in structure. A rocket missile 153 is shown which is provided with a fuel tank 155. A refrigeration jacket 157 encompasses this portion of the missile and is provided with cryogenic seals 159 at the top and bottom thereof to define within the jacket an annular chamber with which inlet and outlet conduits 161 and 163, respectively, communicate. The refrigerant fluid is introduced through conduits 161 and the resulting vapor or mixed vapor and liquid leaves through conduits 163. It must also be noted that it is not necessary that the inlet and outlet conduits be provided on both halves of jacket 157, as adequate refrigeration can be achieved by providing these only on one half, or one on one half and the other on the other half.

The embodiment of FIGURES 18 and 19 is similar to that of FIGURES 16 and 17, except that means are provided for improving heat transfer from the exterior of the missile, comprising a blanket of copper wool 165 carried by the interior of jacket 157 through the medium of spacer members 167. In effect, the blanket of copper wool increases the total surface of the missile from which heat may be extracted, much in the manner of cooling fins.

Figure 20:
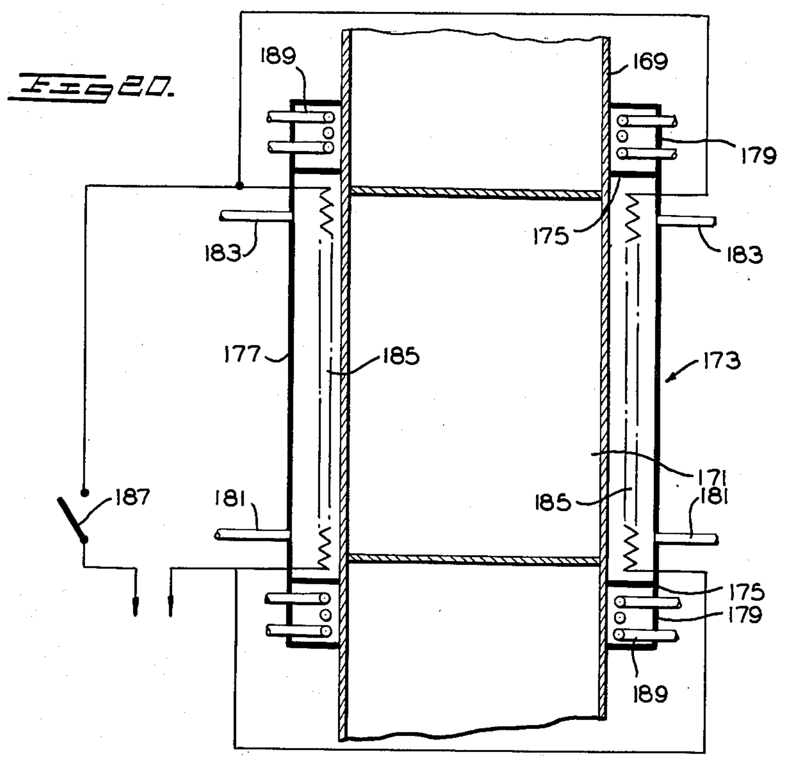

A further modification of the invention is illustrated schematically in FIGURE 20. A rocket missile 169 is provided with a fuel tank 171, and a refrigeration jacket 173 is removably associated therewith. Jacket 173 differs from the previously described jackets, however, in that a pair of vertically spaced internal annular insulated flanges 175 is provided one adjacent each end of the jacket, so as to subdivide the jacket into a central sleeve portion 177 and a pair of annular end portions 179 at opposite ends of the jacket. As in the embodiment of FIGURES 18 and 19, inlet and outlet conduits 181 and 183, respectively, communicate with the interior of the jacket so as to provide for the circulation therein of a fluid at a temperature below the boiling temperature of the cryogenic propellant at the pressure in tank 171. However, these conduits communicate only with central sleeve portion 177, so that this central portion of the jacket is the cooling portion. Also disposed within central sleeve portion 177 are electric resistance heater coils 185 adapted to be selectively placed in circuit with an electric power source (not shown) by manipulation of a switch 187. Thus, immediately prior to launching of the missile, frost which may have crept into the confines of central sleeve portion 177 may be dissipated by briefly closing switch 187 thereby to cause coils 185 to glow red hot, the radiant heat from the coils flashing off the frost immediately prior to launching of the missile.

To eliminate such frost as may nevertheless accumulate adjacent the ends of the jacket while the same is maintained about the missile over long periods of time so as continuously to maintain the missile in condition for launching, tubing 189 is provided within each of annular end portions 179 of the jacket. The purpose of this tubing is to provide passageways for a warm fluid, either in liquid or vapor phase, which serves to warm the cold vapors escaping under positive pressure from central sleeve portion 177 before they contact the atmosphere. In this way, no cold vapors escape to the atmosphere to cause frost deposit on those portions of the skin of the missile which are adjacent but outside the refrigeration jacket. The warm fluid is preferably passed continuously through tubing 189 throughout the time that the refrigerant fluid is passing through conduits 181 and 183, thereby continuously to warm the escaping gas and to assure that the missile components come to thermal equilibrium during the time the jacket is in place. The warm fluid may for example be air at ambient temperature, it not being necessary to clean up the air as it is only in indirect heat exchange relationship with the escaping vapors. Naturally, the features of FIGURE 20 are adaptable for use with a variety of other embodiments of the invention.

Figure 21:
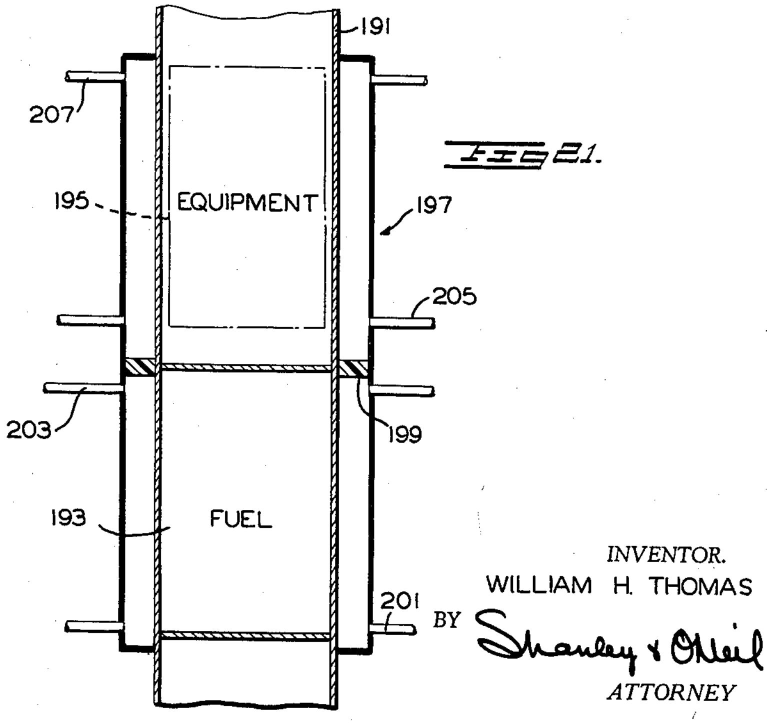

In FIGURES 21 through 24, various embodiments of the present invention are disclosed schematically which are adapted to regulate the heat exchange relationships of various components within the missile. In FIGURE 21, a plural section jacket is disclosed for maintaining different portions of the missile at different temperatures. The missile 191 has a cryogenic fuel tank 193 which is adjacent and equipment chamber 195 in which may be contained the instrumentation and testing equipment and control mechanisms of the missile. A relatively elongated heat transfer jacket 197 is disposed in encompassing relationship about that portion of the exterior of the missile which encloses not only the fuel tank but also the equipment chamber, the respective portions of the jacket being segregated from each other lengthwise by an annular heat insulation seal 199. Thus, the portion of the jacket which encompasses the fuel tank is provided with inlet and outlet conduits 201 and 203 functioning as in the embodiment of FIGURES 18 and 19, while the portion of the jacket encompassing the equipment chamber is provided with similarly functinoing inlet and outlet conduits 205 and 207. It is intended that the heat exchange fluids passing through each of the two circuits thus provided to be at distinctively different temperatures thereby to maintain each of the two jacketed portions of the missile at their optimum temperatures. For example, if the fuel is liquid hydrogen, liquid helium could be the refrigerant in the circuit including conduits 201 and 203; while if it is desired to maintain equipment chamber 195 at a somewhat higher temperature, cooled nitrogen in vapor phase could be used. If it is desired only to maintain the equipment at ambient temperature, then air could be used in the circuit including conduits 205 and 207; while if it is desired to maintain the equipment at temperatures above ambient, then a heated gas could be used. Hence, it will be clear that in its broadest aspects the removable jacket of the present invention is a heat transfer jacket and not necessarily only a cooling jacket.

Figure 22:
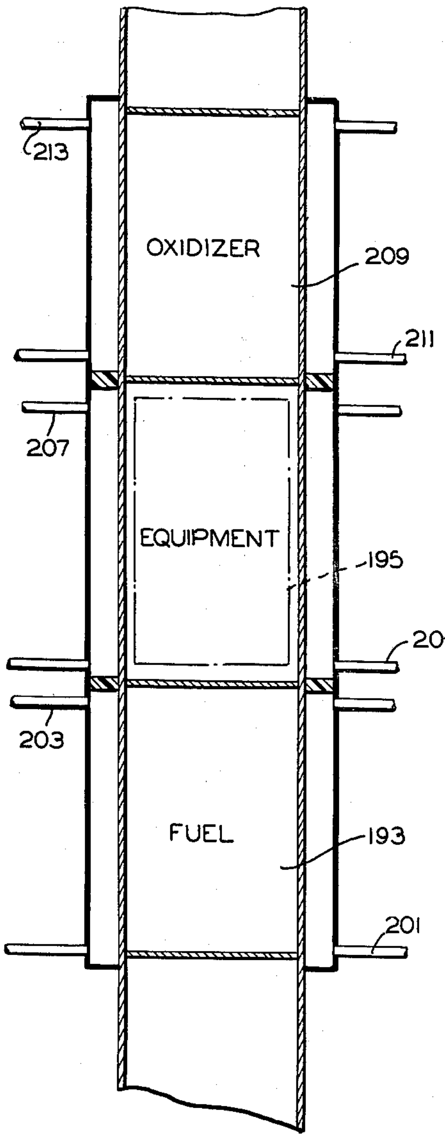

FIGURE 22 discloses an embodiment having components identical with those of FIGURE 21 and which in addition includes an oxidizer tank 209 on the side of the equipment chamber opposite the fuel tank. The missile jacket is correspondingly extended in length, and an additional annular seal is employed so as to define a further closed annular chamber about the oxidizer tank with which communicate inlet and outlet conduits 211 and 213, respectively, for the supply and removal of a suitable refrigerant fluid.

Figure 23:
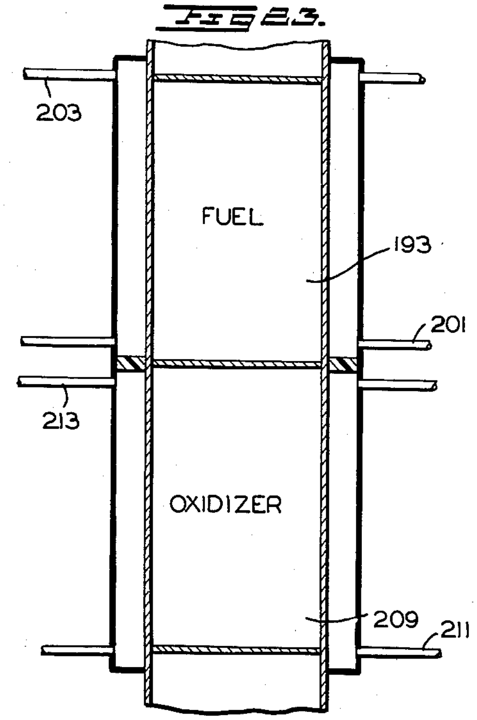

In FIGURE 23, an arrangement quite similar to that of FIGURES 21 and 22 is disclosed, but in which the fuel and oxidizer tanks are adjacent to each other and are cooled by separate circuits of heat exchange fluid at different temperatures supplied to the same jacket.

Figure 24:
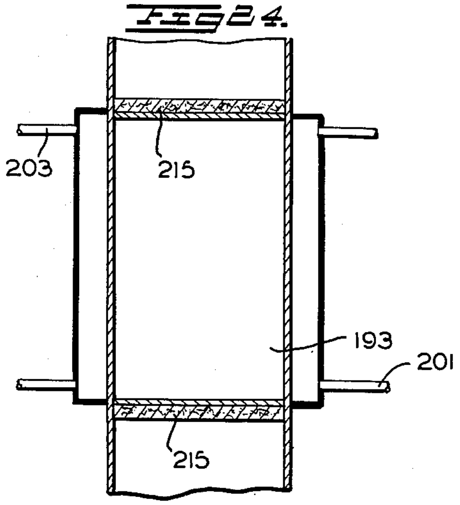

In FIGURE 24, a refrigeration jacket is shown applied to only a single components of a missile comprising the fuel tank, the refrigerant fluid being supplied as described in connection with the preceding several embodiments. The distinctive feature of this embodiment, however, is that insulation 215 is provided on the outer sides of the heads of the fuel tank, thereby to reduce the flow of heat from the adjacent portions of the missile into the fuel tank. As the refrigeration jacket is itself insulated and subject to very little heat transfer therethrough, it will be obvious that the refrigeration load carried by the jacket will be largely due to heat entering the ends of the cryogenic propellant tanks; and hence, it will be appreciated that insulation disposed as shown in FIGURE 24 very markedly reduces the refrigeration load of the jacket.

Naturally, the features of any of FIGURES 8 through 20 may if desired be incorporated in the overall arrangements of FIGURES 21 through 24. The jacket may also be designed to operate at any angle or normal standby position, including horizontal. In addition, the invention may be incorporated in missile elevators, test stands or other devices used in connection with missile operations.

Figure 1:
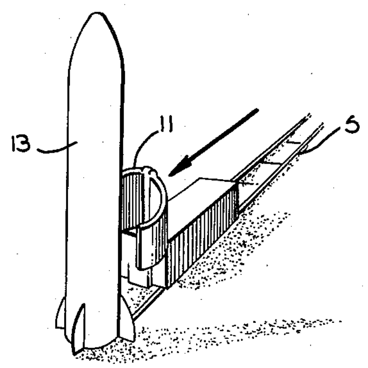
FIGURE 1 is a schematic perspective view of a device according to the present invention approaching operative relationship with a rocket missile.
Figure 2:
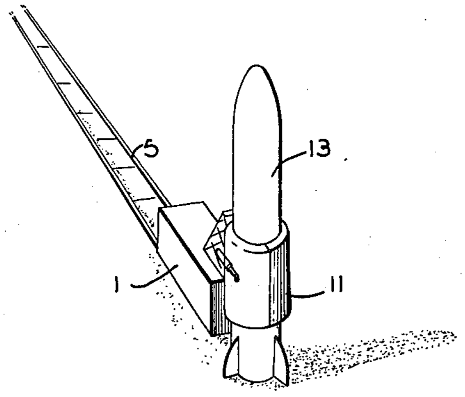
FIGURE 2 is a view similar to FIGURE 1 but showing the device of the present invention engaged with a rocket missile.

The operation of the invention is as follows:

With the missile upended and standing in launching position on the launching pad, carriage 1 carrying the refrigeration jacket is moved toward the missile as seen in FIGURE 1 until the halves of the jacket are disposed on either side of the missile. The fluid motors which move the jacket halves are actuated to cause them to come together about the missile to the position shown in FIGURE 2. The purge gas is then run through the annular chamber between the missile and the jacket so as to remove from that area all substances having a solidification temperature above the boiling temperature of the propellant. Then, the refrigerant fluid is introduced into the interior of the jacket in either direct or indirect heat exchange relationship with the missile, according to the embodiment of the jacket. Preferably, the low boiling propellant is not charged to the missile until after the refrigerant jacket has been in operation a length of time sufficient to lower the temperature of the propellant tanks to about the temperature of the propellant to be charged thereto, or below. In this way, boiling of the propellant upon charging is largely avoided. Thus, the propellant is charged to the continuously refrigerated tanks; and when charging is completed and it has been determined that the desired quantity of propellant is in the tanks, the charging and testing equipment is detached from the missile and removed. Heat continues to flow into the propellant from adjacent portions of the missile, but this heat is continuously removed at the same rate from the propellant by heat exchange with the interior of the refrigeration jacket. At the same time, in the case of the embodiments of FIGURES 12 through 15, the purge fluid is continuously run through the chamber enclosed by the jacket under positive pressure so as to maintain the pressure in that chamber above atmospheric thereby to prevent the entry of atmospheric air with its burden of water and carbon dioxide and to maintain continuously in contact with the exterior of the portion of the missile enclosed by the jacket an atmosphere free from substances solidifying above the temperature of the propellant. In the embodiment of FIGURES 8 and 9, the liquid is introduced at a pressure above atmospheric so that the vapor from this liquid performs the same function; and in the embodiments of the FIGURES 16 through 20, the pressure of the refrigerant fluid serves the same purpose.

The jacket thus remains in place about that portion of the missile which contains the cryogenic propellant for an extended period of time, at least until the components of the missile reach thermal equilibrium. It is intended, in fact, that the jacket remain in place until only an instant before launching of the missile. Naturally, if the interval between emplacement of the jacket and launching of the missile is quite long, it may be necessary periodically to change the fuel if the same has undergone chemical deterioration and to adjust the missile or to perform other test and maintenance operations thereon; but such normal inspection, repair, refueling, replacement of deteriorating propellant or other components or other normal operations on the missile are all within the scope of the present invention.

Thus, the missile stands on its launching pad in a condition of continuous readiness, with the refrigeration jacket in place, the refrigerant continuously circulating therethrough, the components of the missile in thermal equilibrium, and the cryogenic propellant lying subcooled and quiescent in the tanks within the missile.

Figure 3:
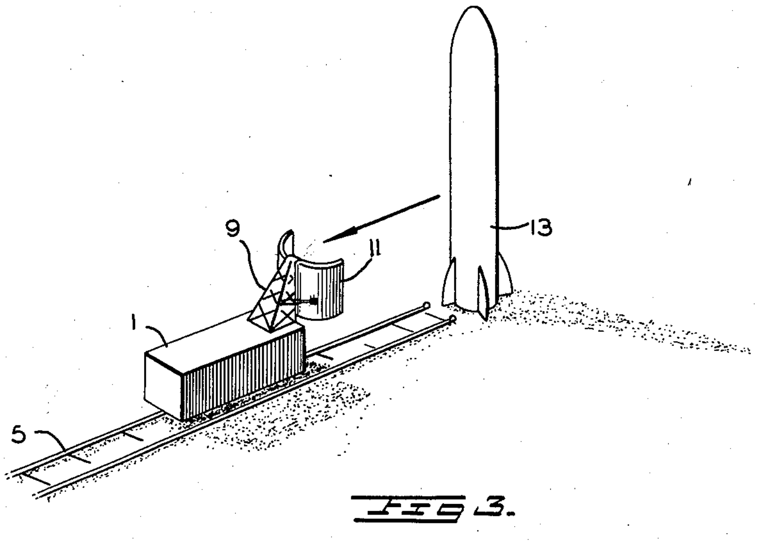
FIGURE 3 is a view similar to FIGURES 1 and 2 but showing a device according to the present invention withdrawing from operative association with a rocket missile.

When the order is received to launch the missile, the heating means of the jacket may be briefly employed to flash off the frost which may nevertheless have accumulated as by the use of the purge lines of FIGURE 8 or the heating coils of FIGURE 20. Immediately thereafter, the fluid motors are actuated to swing the jacket halves apart and the carriage is withdrawn from adjacent the missile as seen in FIGURE 3 and at the end of this same smooth and rapid sequence of events, the missile is instantly launched.

To demonstrate the feasibility of the device according to the present invention, let it be considered that a particular missile has liquid oxygen as one of its propellant components and that the liquid oxygen is contained within a tank pressurized to 50 p.s.i. As illustrated in the drawings, the skin of the missile is the cylindrical wall of the tank and circular heads parallel to each other and spaced apart define the top and bottom walls of the tank. In this hypothetical case, for ease of calculation, the heads are considered to be flat. The material of the tank is aluminum; its height is 45 feet and its diameter is 8.5 feet.

As all the heat withdrawn from the tank will be withdrawn through the cylindrical side walls, heat leak into the tank will be entirely through the heads and its value will be determined according to the following equation:

$$Q=hA(\Delta t) \qquad \text{Equation I}$$

where $h$ is the composite heat transfer coefficient, A is the combined area of the heads and $\Delta t$ is the temperature difference between the heads and the surroundings. The value of $h$ is the sum of the heat transfer coefficient by free convection and the heat transfer coefficient by radiation, and in the case of aluminum is about 2.3 B.t.u./hour/ft. sq./°F. The value of A is twice the area of a circle 8.5 feet in diameter, or 113 square feet. The value of $\Delta t$ for a tank containing liquid oxygen at only moderately elevated pressure can be assumed to be about 300° F.

Thus, substituting in Equation I, the value of Q is seen to be about 78,000 B.t.u/hour. To this must be added the heat leak into the refrigerated jacket from the atmosphere; and assuming fairly good insulation, this value can be taken to be about 5000 B.t.u/hour. Accordingly, the total refrigeration requirement which the refrigerated jacket must handle is 83,000 B.t.u/hour, or 6.9 tons of refrigeration at liquid nitrogen temperature. As 50 kilowatt hours per ton of refrigeration are required at liquid nitrogen temperature, it is apparent that about 345 kilowatt hours or 465 B.H.P. are required to maintain the liquid oxygen tank in the no-loss condition represented by thermal equilibrium. As is well known, such refrigeration requirements can be easily met using existing closed cycle nitrogen refrigeration systems.

There remains the question of whether adequate refrigeration can be transferred from the jacket to the missile at the temperatures and using the materials involved. This refrigeration, of course, corresponds only to the 78,000 B.t.u./hour heat transfer from the missile to the jacket, rather than to the entire refrigeration load of the jacket. To see whether adequate refrigeration transfer can be obtained, let it be considered that the liquid nitrogen in the jacket is boiling and that the pressure at the top of the jacket is 22 p.s.i. absolute, whereupon the pressure at the bottom of the jacket 45 feet lower would be 37.6 p.s.i.a. At these pressures, the temperature at the top of the jacket would be −314° F. and that at the bottom of the jacket −304.3° F. for an average boiling liquid nitrogen temperature of about −309° F.

Let it also be assumed that the oxygen in the missile is liquid at 50 p.s.i.g. maximum working pressure, whereupon the pressure at the bottom of the tank would be 64.7 p.s.i.a. and the pressure of the top of the tank, 45 feet above, would be 42.7 p.s.i.a. At these pressures, the temperature at the bottom of the tank would be −266.6° F. and that at the top of the tank −276.5° F. for an average temperature of about −271.5° F.

In order to determine the required heat transfer coefficient, reference is had to the following equation:

$$U=\frac{Q}{A(\Delta t)} \qquad \text{Equation II}$$

where U is the heat transfer coefficient, Q is 78,000 B.t.u./hour, A is the area of the side walls of a cylinder 45 feet high and 8.5 feet in diameter, or 1200 square feet, and $\Delta t$ is the difference between the average temperature of the boiling liquid nitrogen and the average temperature of the liquid oxygen, or 37.5° F. Thus, U is seen to have a value of 1.73. As will be readily appreciated, such heat transfer coefficients are easily obtainable; and indeed, substantially higher coefficients will in fact be encountered by the practice of the present invention in connection with existing unmodified missiles. The low value of the required heat transfer coefficient also demonstrates that working pressures substantially below 50 p.s.i.g. can be maintained for the liquid oxygen without boil-off.

Although refrigerant jackets according to the present invention can easily meet the refrigeration requirements, as demonstrated above, it will also be obvious that the use of insulation on the tank heads will greatly reduce even these readily obtainable refrigeration requirements.

Thus, the present invention provides successful methods and apparatus for maintaining rocket missiles powered by low-boiling propellants continuously in condition for instant launching, thereby securing the advantage of low-boiling propellants and eliminating the disadvantages thereof. The invention also provides methods and apparatus for assuring that a fully charged, closed missile system will be at thermal equilibrium at launching, as the heat entering the ends of the propellant tanks can be precisely balanced by the heat withdrawn from the side walls of the propellant tanks. The invention also provides methods and apparatus for preventing deposits of frost on missiles that are fully charged with low-boiling propellant over long periods of time, as the areas of frost deposit are masked and the atmosphere adjacent those areas is controlled so as to be free from substances solidifying above the temperature of the propellant. Furthermore, the invention provides methods and apparatus which make it possible to control with great accuracy the quantity of low-boiling propellant and to maintain that accurately controlled quantity without variation and with a minimum of effort, as boil-off is substantially eliminated at all times between charging and launching. Moreover, the subcooling of the propellant makes possible the maintenance to substantially reduced working pressures within the missile and enables the pumping of propellant in completely liquid phase during and after launching. The invention further provides methods and apparatus which greatly reduce the hazards involved in the use of highly flammable or highly toxic and corrosive low-boiling propellants as boil-off is eliminated so that no propellant vapor is discharged to the ambient atmosphere. It will also be noted that the present invention provides methods and apparatus which are useful equally well in connection with stationary, mobile or underground missile installations, as the carriage and jacket of the present invention are quite compact, readily portable and require a minimum of space for operation. Finally, it should be noted that the present invention provides methods and apparatus which require little or no modification of existing rocket missile designs as the equipment of the present invention conforms to existing missile contours and as demonstrated above functions successfully in connection with missile designs having characteristics as at present.

Therefore, it will be apparent that all of the initially recited objects of the present invention have been achieved.

Although the present invention has been described and illustrated in connection with preferred embodiments, it is to be understood that modifications and variations may be resorted to without departing from the broad spirit and scope of the invention, as those skilled in this art will readily understand. Such modifications and variations are considered to be within the purview and scope of the present invention as defined by the appended claims.

What is claimed is:

1. A method for maintaining continuously in condition for launching rocket missiles powered by low-boiling propellant contained in a chamber the outer wall of which is the outer wall of the missile, comprising the steps of (1) enclosing at least that portion of the outer wall of the missile which is the outer wall of the chamber to prevent entry of ambient atmosphere from outside the enclosure to within the enclosure, (2) contacting the exterior of the enclosed portion of the outer wall of the missile with a gas at a temperature substantially higher than the temperature of the propellant and free from substances having a solidification temperature above the temperature of the propellant, and (3) thereafter maintaining a fluid within the enclosure in contact with the exterior of the enclosed portion of the outer wall of the missile and at a temperature below the boiling temperature of the propellant at the existing pressure and free from substances which have a solidification temperature above the temperature of the fluid, for an extended period of time at least until the components of the missile reach thermal equilibrium.

2. Apparatus for maintaining continuously in condition for launching rocket missiles powered by low-boiling propellant contained in a chamber the outer wall of which is the outer wall of the missile, comprising an elongated cylindrical heat exchange jacket adapted to encompass the exterior of at least that portion of the outer wall of the missile which is the outer wall of the chamber and to exclude ambient atmosphere from between the jacket and the exterior of the missile, the jacket being removable from the missile, means for maintaining within the confines of the jacket between the jacket and the exterior of the missile a fluid at a temperature below the temperature of the propellant at the existing pressure and at a pressure above ambient atmospheric pressure and free from substances which have a solidification temperature above the temperature of the fluid, and means on the interior of the jacket for selectively applying heat to the exterior of said portion of the missile.

3. A cylindrical rocket missile continuously in condition for launching, the missile comprising means defining a chamber containing liquid low-boiling propellant having a boiling temperature substantially below atmospheric temperature, the outer wall of the chamber being the outer wall of the missile, a heat exchange jacket elongated axially of the missile and encompassing at least that portion of the outer wall of the missile which is the outer wall of the chamber, the jacket being removable from the missile, means for maintaining a fluid inside the jacket but outside the missile and in contact with the exterior of that portion of the outer wall of the missile which is the outer wall of the chamber and at a temperature below the boiling temperature of the propellant at the existing pressure, the components of the missile being at thermal equilibrium, and means on the interior of the jacket for selectively applying heat to the exterior of said portion of the outer wall of the missile.

4. Apparatus for maintaining continuously in condition for launching rocket missiles powered by low-boiling propellant contained in a chamber the outer wall of which is the outer wall of the missile, comprising at least one carriage, a vertically elongated heat exchange jacket mounted on said at least one carriage and adapted to encompass the exterior of at least that portion of the outer wall of the missile which is the outer wall of the chamber, the jacket being comprised of a plurality of separable sections mounted on said at least one carriage for movement with said at least one carriage toward the missile to encompass the exterior of the missile and away from the missile to free the missile for launching, means for bodily horizontally moving said at least one carriage, and means for maintaining a fluid within the jacket in contact with the exterior of that portion of the outer wall of the missile which is the outer wall of the chamber and at a temperature below the boiling temperature of the propellant at the existing pressure.

5. Apparatus as claimed in claim 4, said fluid being at a pressure above ambient atmospheric pressure.

References Cited in the file of this patent

UNITED STATES PATENTS

| | | |
|---|---|---|
| 1,680,873 | Lucas-Girardville | Aug. 14, 1928 |
| 2,140,043 | Zarotschenzeff | Dec. 13, 1938 |
| 2,140,744 | Hirsch | Dec. 20, 1938 |
| 2,148,109 | Dana | Feb. 21, 1939 |
| 2,260,134 | Ballman | Oct. 21, 1941 |
| 2,260,395 | Mudge | Oct. 28, 1941 |
| 2,395,113 | Goddard | Feb. 19, 1946 |
| 2,400,168 | Roach | May 14, 1946 |
| 2,415,455 | Barnes et al. | Feb. 11, 1947 |
| 2,468,492 | Gazda | Apr. 26, 1949 |
| 2,522,113 | Goddard | Sept. 12, 1950 |
| 2,522,114 | Goddard | Sept. 12, 1950 |
| 2,534,478 | Roberts | Dec. 19, 1950 |
| 2,618,939 | Morrison | Nov. 25, 1952 |
| 2,648,325 | Siple | Aug. 11, 1953 |
| 2,707,377 | Morrison | May 3, 1955 |
| 2,712,738 | Wucherer | July 12, 1955 |
| 2,807,942 | Dahlgren | Oct. 1, 1957 |
| 2,834,187 | Loveday | May 13, 1958 |
| 2,858,408 | Banoero | Oct. 28, 1958 |
| 2,873,933 | Fanti | Feb. 17, 1959 |
| 2,896,416 | Henry | July 28, 1959 |
| 2,959,023 | Webster | Nov. 8, 1960 |
| 2,963,873 | Stowers | Dec. 13, 1960 |